United States Patent
Sayama

(10) Patent No.: US 11,947,166 B2
(45) Date of Patent: Apr. 2, 2024

(54) OPTICAL FIBER CABLE, OPTICAL COMBINER UNIT USING OPTICAL FIBER CABLE, AND LASER DEVICE

(71) Applicant: Fujikura Ltd., Tokyo (JP)

(72) Inventor: Tadayoshi Sayama, Sakura (JP)

(73) Assignee: Fujikura Ltd., Tokyo (JP)

( * ) Notice: Subject to any disclaimer, the term of this patent is extended or adjusted under 35 U.S.C. 154(b) by 347 days.

(21) Appl. No.: 17/428,075

(22) PCT Filed: Feb. 18, 2020

(86) PCT No.: PCT/JP2020/006257
§ 371 (c)(1),
(2) Date: Aug. 3, 2021

(87) PCT Pub. No.: WO2020/171059
PCT Pub. Date: Aug. 27, 2020

(65) Prior Publication Data
US 2022/0120971 A1    Apr. 21, 2022

(30) Foreign Application Priority Data
Feb. 21, 2019 (JP) .................. 2019-029420

(51) Int. Cl.
*G02B 6/26* (2006.01)
*G02B 6/42* (2006.01)
(Continued)

(52) U.S. Cl.
CPC .............. *G02B 6/262* (2013.01); *G02B 6/42* (2013.01); *G02B 6/4296* (2013.01);
(Continued)

(58) Field of Classification Search
CPC ........ G02B 6/262; G02B 6/42; G02B 6/4296; G02B 6/4416; G02B 6/443;
(Continued)

(56) References Cited

U.S. PATENT DOCUMENTS 4,883,054 A * 11/1989 Fuller .................. G02B 6/4469
356/73.1
6,829,427 B1 * 12/2004 Becker ................... A61B 18/22
250/227.28
(Continued)

FOREIGN PATENT DOCUMENTS

CN      102844942 A    12/2012
CN      203579315 U    5/2014
(Continued)

OTHER PUBLICATIONS

International Search Report issued in International Application No. PCT/JP2020/006257, dated Mar. 31, 2020 (3 pages).

*Primary Examiner* — Ryan A Lepisto
(74) *Attorney, Agent, or Firm* — Osha Bergman Watanabe & Burton LLP

(57) ABSTRACT

An optical fiber cable includes: an optical fiber; a cable jacket that includes inner and outer tubes; first and second open detection lines; and an optical connector disposed at a first end of the optical fiber cable. A first end of the first open detection line and a first end of the second open detection line are disposed inside the optical connector and are not electrically connected to each other inside the optical connector. The optical fiber is disposed in one of a first region and a second region, wherein the first region is inside the inner tube and the second region is between the inner tube
(Continued)

and the outer tube, and at least one of the first and second open detection lines is disposed in the other of the first region and the second region.

8 Claims, 6 Drawing Sheets

(51) Int. Cl.
*G02B 6/44* (2006.01)
*H01S 3/00* (2006.01)
*H01S 3/067* (2006.01)
*H01S 3/23* (2006.01)

(52) U.S. Cl.
CPC ........... *G02B 6/4416* (2013.01); *G02B 6/443* (2013.01); *H01S 3/0014* (2013.01); *G02B 2006/4297* (2013.01); *H01S 3/005* (2013.01); *H01S 3/067* (2013.01); *H01S 3/2383* (2013.01)

(58) Field of Classification Search
CPC . G02B 2006/4297; H01S 3/005; H01S 3/067; H01S 3/2383
See application file for complete search history.

(56) References Cited

U.S. PATENT DOCUMENTS

| | | | |
|---|---|---|---|
| 7,079,733 B2* | 7/2006 | Toriumi | G02B 6/4416 439/577 |
| 9,837,791 B1* | 12/2017 | Brown | H01S 5/06837 |
| 11,314,027 B2* | 4/2022 | Armbruster | H04B 10/032 |
| 2011/0221601 A1* | 9/2011 | Aguren | G02B 6/3895 340/653 |
| 2016/0359288 A1* | 12/2016 | Matsuoka | G02B 6/4286 |

FOREIGN PATENT DOCUMENTS

| | | | |
|---|---|---|---|
| JP | H05-183224 A | | 7/1993 |
| JP | 2003-014579 A | | 1/2003 |
| JP | 2003014579 A | * | 1/2003 |
| JP | 2003-279444 A | | 10/2003 |
| JP | 2004-085310 A | | 3/2004 |
| JP | 2004-205764 A | | 7/2004 |
| JP | 2004-219244 A | | 8/2004 |
| JP | 2004-350155 A | | 12/2004 |
| JP | 2014-224898 A | | 12/2014 |

* cited by examiner

OPTICAL FIBER CABLE, OPTICAL COMBINER UNIT USING OPTICAL FIBER CABLE, AND LASER DEVICE

CROSS-REFERENCE TO RELATED APPLICATIONS

This application claims priority from Japanese Patent Application No. 2019-029420 filed on Feb. 21, 2019, the contents of which are incorporated herein by reference in their entirety.

BACKGROUND

Technical Field

The present invention relates to an optical fiber cable, an optical combiner unit using an optical fiber cable, and a laser device.

Description of Related Art

An optical fiber cable, through which high-power laser light propagates, is required to quickly reduce the output of the laser light, when the optical fiber is damaged for some reason. Patent Document 1 describes a technique for detecting an abnormality that occurs in an optical fiber cable when the optical fiber is damaged.

Patent Document

[Patent Document 1]
Japanese Unexamined Patent Application, First Publication No. 2004-205764

Incidentally, when connecting the optical fiber cable to the laser head, a connection failure may occur. When the laser light is output in the state of connection failure, the laser light may exit to the external space from the location where the connection failure occurs.

SUMMARY

One or more embodiments of the present invention provide an optical fiber cable, an optical combiner unit using an optical fiber cable, and a laser device which are capable of detecting a connection failure between the optical fiber cable through which laser light propagates and the laser head.

An optical fiber cable according to one or more embodiments of the present invention includes an optical fiber through which laser light output from a light source propagates; a cable jacket including an inner tube and an outer tube covering the inner tube; a pair of open detection lines including a first open detection line and a second open detection line; and an optical connector disposed at a first end of the optical fiber cable, in which a first end of the first open detection line and a first end of the second open detection line are disposed inside the optical connector, and are not electrically connected to each other inside the optical connector, the optical fiber is disposed in either a first region inside the inner tube, or a second region between an outside (i.e., an outer surface) of the inner tube and an inside (i.e., an inner surface) of the outer tube, and at least one of the pair of open detection lines is disposed in either the first region or the second region in which the optical fiber is not disposed.

When the optical fiber cable is connected to the laser head, the connecting member (bayonet) provided in the laser head and the optical connector of the optical fiber cable are connected. Here, a short circuit is provided in the connecting member such that the first open detection line and the second open detection line are electrically connected to each other. When the optical connector of the optical fiber cable is properly connected to the laser head, the first open detection line and the second open detection line are electrically connected to each other. On the other hand, when a connection failure occurs between the optical fiber cable and the laser head, the first open detection line and the second open detection line are not electrically connected. In this way, it is possible to determine whether or not a connection failure between the connecting member and the optical connector has occurred, depending on whether or not the first open detection line and the second open detection line are energized. This makes it possible to detect a connection failure between the optical fiber cable and the laser head.

Further, at least one of the open detection lines is disposed in a region where the optical fiber is not disposed. With this configuration, even if a breaking of the optical fiber occurs in the optical fiber cable, the breaking of the optical fiber can be detected, for example, by a breaking of at least one of the open detection lines. Further, since one of the open detection lines is separated from the optical fiber by the partition wall of the inner tube, it is possible to prevent the pair of open detection lines from coming into contact with each other and being energized.

Further, the optical fiber cable may further include a pair of breaking detection lines including a first breaking detection line and a second breaking detection line, in which a first end of the first breaking detection line and a first end of the second breaking detection line may be disposed inside the optical connector and electrically connected to each other inside the optical connector.

According to such a configuration, it is possible to detect a breaking of the optical fiber in the optical fiber cable in addition to a connection failure between the connecting member and the optical connector. Further, since the breaking detection line and the open detection line are configured independently, it is possible to independently perform the breaking detection of the optical fiber and the open detection in the optical connector.

Further, the first end of the first breaking detection line and the first end of the second breaking detection line may be electrically connected to each other inside the optical connector via a temperature sensor.

With such a configuration, the breaking detection line can also be used as the temperature detection line. That is, the pair of detection lines can have both the functions of detecting the breaking of the optical fiber and measuring the temperature inside the optical connector.

Further, the optical fiber and the first breaking detection line may be disposed in the first region, and the second breaking detection line, the first open detection line, and the second open detection line may be disposed in the second region.

According to such a configuration, when the optical fiber is broken due to some abnormality, the first breaking detection line disposed in the inner tube is fused and the breaking of the optical fiber is detected. Further, since the first region in which the optical fiber and the first breaking detection line are disposed and the second region in which the second breaking detection line, the first open detection line, and the second open detection line are disposed are separated by the partition wall of the inner tube, it is suppressed that the first breaking detection line and the second breaking detection line come into contact with each other and are energized again.

As a result, the breaking of the optical fiber can be reliably detected. Similarly, it is possible to prevent the first open detection line and the second open detection line from being damaged and energized by the leaked laser light. This makes it possible to reliably detect a connection failure between the optical fiber cable and the laser head.

Further, among the first breaking detection line, the second breaking detection line, the first open detection line, and the second open detection line, at least a part of the first breaking detection line may be disposed at a position closest to the optical fiber inside the cable jacket, the second breaking detection line located inside the cable jacket may be coated with an insulating layer, and the first breaking detection line located inside the cable jacket may have no insulating layer or may be coated with an insulating layer having a thickness smaller than a thickness of an insulating layer of the second breaking detection line.

According to such a configuration, when a breaking occurs in the optical fiber due to some abnormality, the first breaking detection line can be preferentially fused, and it is possible to detect the breaking of the optical fiber at an early stage.

Further, the optical fiber and the first breaking detection line may be integrated by a coating member (i.e., a coating tube) at least in part.

According to such a configuration, when a breaking occurs in the optical fiber due to some abnormality, the first breaking detection line can be further preferentially fused, and it is possible to detect the breaking of the optical fiber at an early stage.

Further, the optical fiber and the first breaking detection line may be integrated by the coating member at least in part inside the optical connector.

For example, when a laser light is applied to a workpiece, the optical fiber is likely to be broken inside the optical connector due to the influence of the reflected light. According to such a configuration, when a breaking occurs in the optical fiber inside the optical connector where the optical fiber is likely to be broken, the first breaking detection line can be preferentially fused, and it is possible to detect the breaking of the optical fiber in the optical connector at an early stage.

Further, an optical combiner unit according to one or more embodiments of the present invention includes the optical fiber cable; and an optical combiner that receives light output from a plurality of input optical fibers, in which an exit end of the optical combiner and a core of the optical fiber disposed in the optical fiber cable are optically connected.

With the above optical fiber cable, it is possible to achieve an optical combiner unit capable of detecting a connection failure between the optical fiber cable and the laser head.

Further, the laser device according to one or more embodiments of the present invention may include the optical fiber cable and at least one light source that emits light propagating through the optical fiber cable.

With the above optical fiber cable, it is possible to achieve a laser device capable of detecting a connection failure between the optical fiber cable and the laser head.

As described above, according to the optical fiber cable of one or more embodiments of the present invention, it is possible to detect a connection failure between the optical fiber cable through which the laser light propagates and the laser head.

Further, according to the optical combiner unit of one or more embodiments of the present invention, by providing the optical fiber cable, it is possible to detect a connection failure between the optical fiber cable through which the laser light propagates and the laser head.

Further, in the laser device according to one or more embodiments of the present invention, by providing the optical fiber cable, it is possible to detect a connection failure between the optical fiber cable through which the laser light propagates and the laser head.

DETAILED DESCRIPTION

Hereinafter, embodiments of an optical fiber cable, an optical combiner unit using the optical fiber cable, and a laser device according to the present embodiment will be described in detail with reference to the drawings.

First, the configuration of a laser device 100 of the present embodiment will be described.

Figure 6:
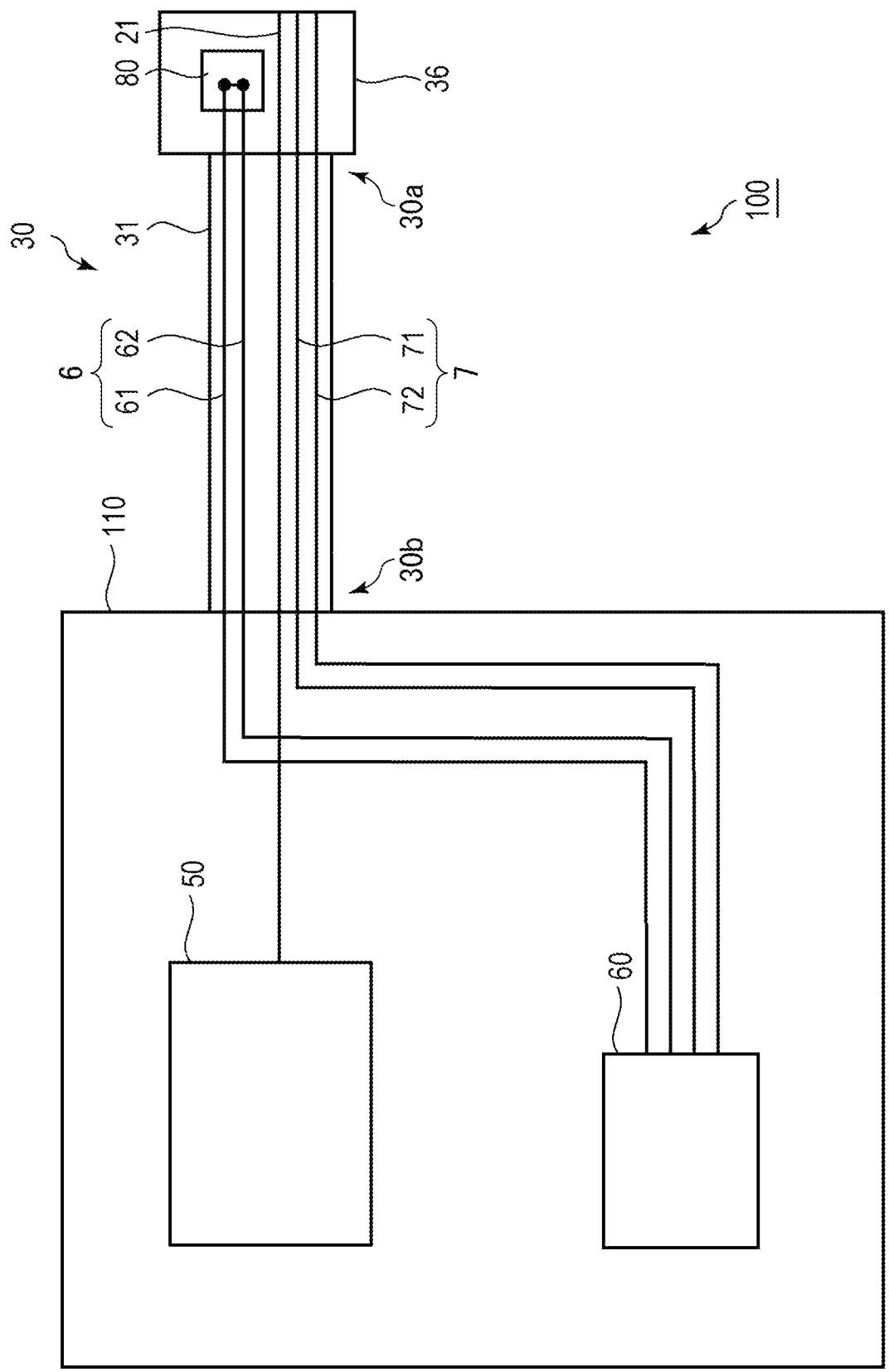
FIG. 6 is a conceptual diagram showing a laser device according to the present embodiment.

FIG. 6 is a conceptual diagram showing a laser device 100 according to an embodiment of the present invention. As shown in FIG. 6, the laser device 100 of the present embodiment includes a laser system main body 110 and an optical fiber cable 30 as main components.

The laser system main body 110 has a light source 50 and a determination unit 60. The second end 30b of the optical fiber cable 30 is connected to the laser system main body 110.

The optical fiber cable 30 includes an optical fiber 21, an open detection line 7, a breaking detection line 6, a cable jacket 31, and an optical connector 36.

The laser light output from the light source 50 propagates through the optical fiber 21 and is launched to the outside from the optical connector 36.

The second end of the first open detection line 71 and the second end of the second open detection line 72 are connected to the determination unit 60, and are electrically connected to each other via the determination unit 60.

The second end of a first breaking detection line 61 and the second end of a second breaking detection line 62 are connected to the determination unit 60, and are electrically connected to each other via the determination unit 60.

Figure 1:
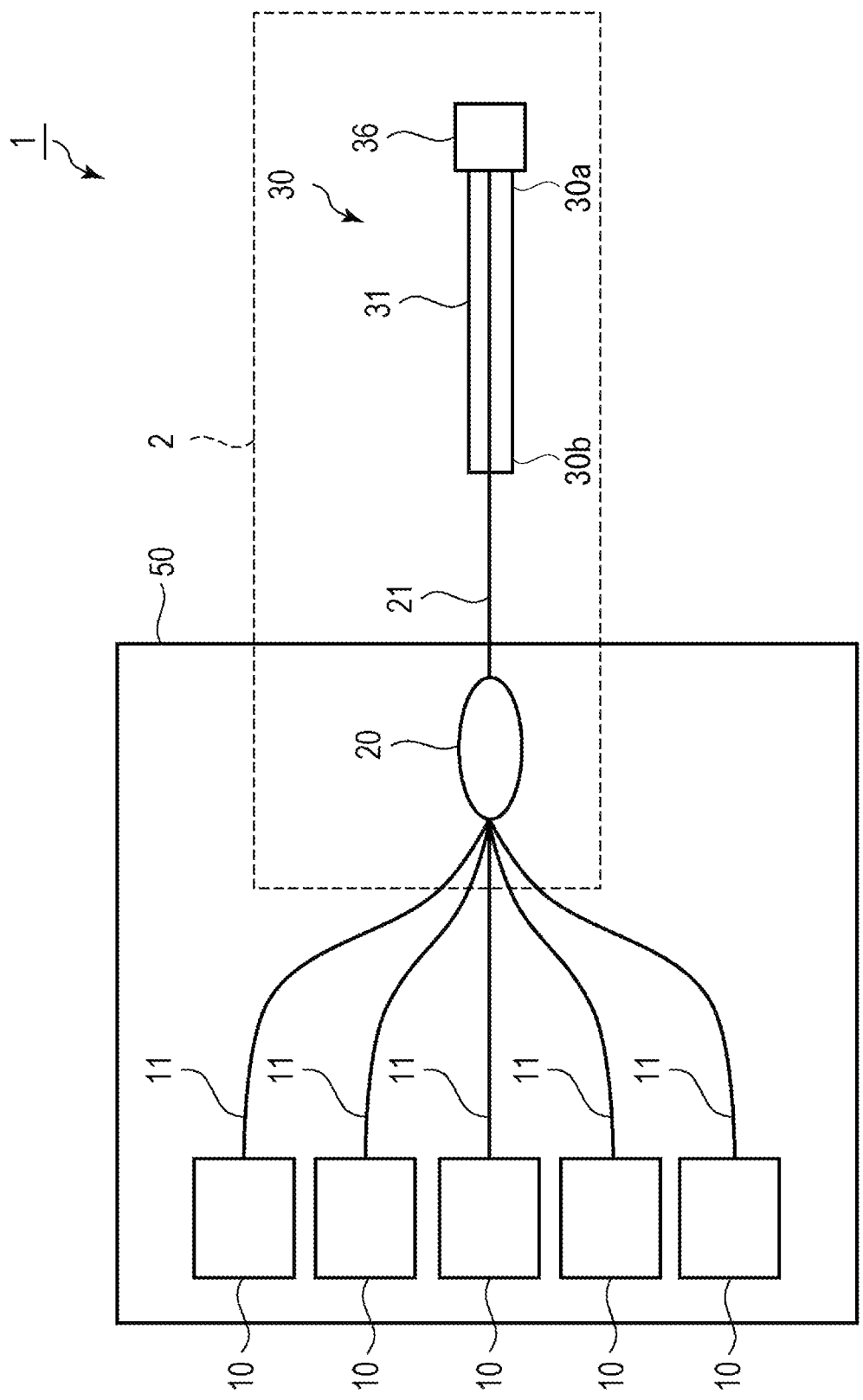
FIG. 1 is a conceptual diagram showing a part (light propagation unit) of a laser device according to the present embodiment.

FIG. 1 is a conceptual diagram showing a light propagation unit 1 of the laser device 100 according to the present embodiment. As shown in FIG. 1, the light propagation unit 1 of the present embodiment includes a light source 50 and an optical fiber cable 30 as main components. Further, an optical combiner unit 2 of the present embodiment includes a plurality of input optical fibers 11, an optical combiner 20, and an optical fiber cable 30 as main components.

Note that, in FIG. 1, the configuration other than the light propagation unit 1 of the laser device 100 is not shown for the sake of explanation.

The light source 50 includes a plurality of laser units 10, a plurality of input optical fibers 11, and an optical combiner 20.

Each laser unit 10 is a laser light source that emits signal light having a predetermined wavelength, and is, for example, a fiber laser device or a solid-state laser device. When the laser unit 10 is a fiber laser device, for example, a resonator type fiber laser device or a Master Oscillator Power Amplifier (MO-PA) type fiber laser device is used. The signal light emitted from each laser unit 10 is, for example, light having a wavelength of 1070 nm.

The signal light is not limited to the light including the signal.

An input optical fiber 11 that propagates signal light output from the laser unit 10 is connected to each laser unit 10. The input optical fiber 11 includes a bare fiber, and a coating layer formed on the outer periphery of the bare fiber. The bare fiber is made of, for example, silica-based glass, and transmits light. The bare fiber has a core, and a cladding that covers the core. The coating layer is made of, for example, a UV curable resin, and covers the bare fiber. The coating layer may be formed of one resin layer, or may include two layers, that is, a primary layer and a secondary layer. Alternatively, the coating layer may have two or more resin layers.

Each input optical fiber 11 is, for example, a few mode fiber having a core diameter of about 20 μm. Therefore, the signal light emitted from each laser unit 10 propagates through each input optical fiber 11 in the Linearly Polarized (LP) mode of about 2 to 10.

The optical combiner 20 is a member that connects the cores of a plurality of input optical fibers 11 and the core of the optical fiber 21. In the optical combiner 20, for example, the end face of each input optical fiber 11 and the end face of the optical fiber 21 having a diameter larger than that of the input optical fiber 11 are connected.

The optical fiber 21 includes a bare fiber, and a coating layer formed on the outer periphery of the bare fiber. The bare fiber is made of, for example, silica-based glass, and transmits light. The bare fiber has a core, and a cladding that covers the core. The coating layer of the optical fiber 21 may have the same configuration as the coating layer of the input optical fiber 11.

The optical fiber 21 may be a multimode fiber having a core diameter of about 50 μm to 100 μm and a cladding outer diameter of about 360 μm, for example.

The optical fiber cable 30 will be described with reference to FIGS. 1 to 6.

As shown in FIG. 1, the optical connector 36 is attached to the first end 30a of the optical fiber cable 30. At the second end 30b of the optical fiber cable 30, the optical fiber 21 is connected to the optical combiner 20. At the second end 30b of the optical fiber cable 30, the optical fiber 21 extends from the cable jacket 31 of the optical fiber cable 30, and the optical fiber 21 extending from the optical fiber cable 30 may be connected to the optical combiner 20. In FIGS. 1 to 6, the same or corresponding constituent elements are designated by the same reference numerals, and duplicate description will be omitted.

Figure 2:
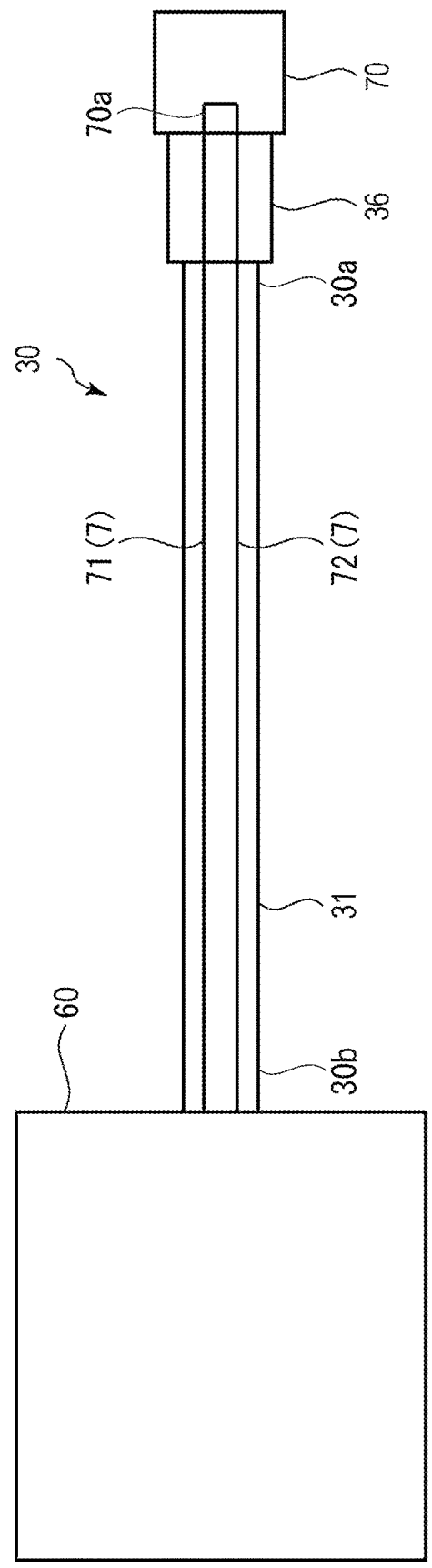
FIG. 2 is a conceptual diagram showing a part (open detection line portion) of the laser device according to the present embodiment.

FIG. 2 shows an open detection unit of the laser device 100. The open detection unit includes an optical fiber cable 30 and the determination unit 60.

As shown in FIG. 2, the optical connector 36 disposed at the first end 30a of the optical fiber cable 30 is connected to a connecting member (bayonet) 70 provided on a laser head (not shown).

On the second end 30b side of the optical fiber cable 30, the first open detection line 71 and the second open detection line 72 are connected to the determination unit 60.

Note that, in FIG. 2, the configuration other than the open detection unit of the laser device 100 is not shown for the sake of explanation. Further, in FIG. 2, the second end 30b of the optical fiber cable 30 is connected to the determination unit 60, but the first open detection line 71 and the second open detection line 72 extend from the second end 30b of the optical fiber cable 30, and the extended first open detection line 71 and the extended second open detection line 72 may be connected to the determination unit 60.

(Open Detection Line)

The pair of open detection lines 7 are inserted into the cable jacket 31. The open detection lines 7 are made of, for example, a conductive metal. The pair of open detection lines 7 has a first open detection line 71 and a second open detection line 72. The first end of the first open detection line 71 extends to the inside of the optical connector 36. Similarly, the first end of the second open detection line 72 extends to the inside of the optical connector 36. In the optical fiber cable 30, the pair of open detection lines 7 are not electrically connected to each other. Further, the first ends of the first and second open detection lines 71 and 72 disposed in the optical connector 36 are not electrically connected to each other.

Further, as shown in FIG. 6, the second end of the first open detection line 71 and the second end of the second open detection line 72 are connected to the determination unit 60, and are electrically connected to each other via the determination unit 60.

As shown in FIG. 2, when the optical fiber cable 30 is connected to the laser head (not shown), the connecting member 70 provided in the laser head and the optical connector 36 of the optical fiber cable 30 are connected. Here, the connecting member 70 is provided with a short circuit 70a, and when the connecting member 70 and the optical connector 36 are properly connected, the first open detection line 71 and the second open detection line 72 are electrically connected to each other.

In this way, the determination unit 60 monitors the energized state of the electric circuit between the first open detection line 71 and the second open detection line 72. The determination unit 60 determines that the laser device 100 is capable of emitting laser light, when it is detected that the circuits of the open detection lines 7 are energized and the connecting member 70 and the optical connector 36 are properly connected. The determination unit 60 transmits, to the light source 50, information that the laser device 100 is capable of emitting laser light.

On the other hand, when the connecting member 70 and the optical connector 36 are not properly connected, that is, when a connection failure occurs, the first open detection line 71 and the second open detection line 72 are not electrically connected. In this case, a closed circuit is not formed between the first open detection line 71 and the second open detection line 72. The determination unit 60, which monitors the energized state, detects that the connecting member 70 and the optical connector 36 are not properly connected, and determines that the laser device 100 is not available to emit the laser light. Further, the determination unit 60 controls the light source 50 such that the laser device 100 does not emit the laser light. Thus, the laser device 100 stops emitting the laser light, so that it is possible to prevent the laser light from erroneously exiting from between the connecting member 70 and the optical connector 36. Further, since it is possible to prevent the laser light from applying to the user, the safety of the user is ensured.

In this way, it is possible to determine whether or not a connection failure between the connecting member 70 and the optical connector 36 has occurred, depending on whether or not the first open detection line 71 and the second open detection line 72 are energized. This makes it possible to detect a connection failure between the optical fiber cable 30 and the laser head.

Figure 3A:
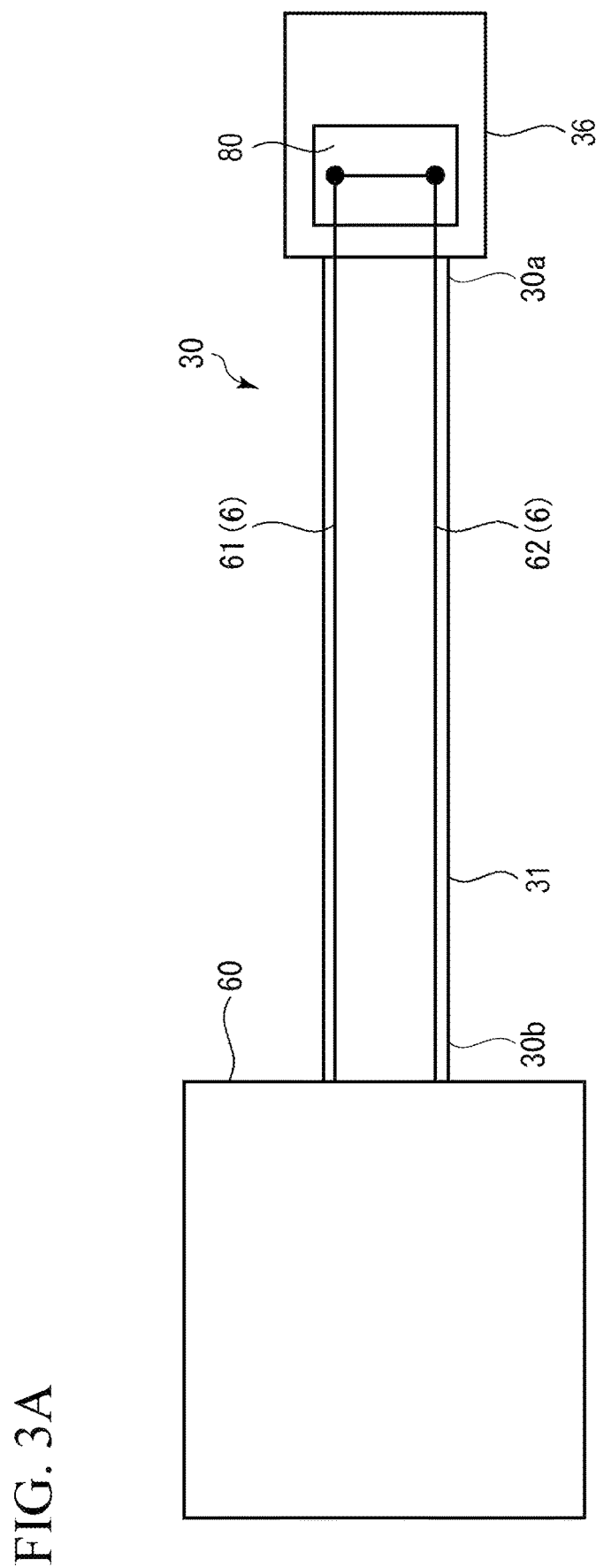
FIG. 3A is a conceptual diagram showing a part (breaking detection line portion) of the laser device according to the present embodiment.

FIG. 3A shows a breaking detection unit of the laser device 100. The breaking detection unit includes an optical fiber cable 30 and a determination unit 60.

As shown in FIG. 3A, the optical connector 36 disposed at the first end 30a of the optical fiber cable 30 includes a circuit board 80.

On the second end 30b side of the optical fiber cable 30, the first breaking detection line 61 and the second breaking detection line 62 are connected to the determination unit 60.

Note that, in FIG. 3A, the configuration other than the breaking detection unit of the laser device 100 is not shown for the sake of explanation. Further, in FIG. 3A, the second end of the optical fiber cable 30 is connected to the determination unit 60, but the first breaking detection line 61 and the second breaking detection line 62 extend from the optical fiber cable 30, and the extended first breaking detection line 61 and the extended second breaking detection line 62 may be connected to the determination unit 60.

(Breaking Detection Line)

As shown in FIG. 3A, a pair of breaking detection lines 6 are inserted into the cable jacket 31. The breaking detection lines 6 are made of, for example, a conductive metal. The pair of breaking detection lines 6 has a first breaking detection line 61 and a second breaking detection line 62. The first end of the first breaking detection line 61 extends to the inside of the optical connector 36, and is connected to the circuit board 80 in the optical connector. Further, the first end of the second breaking detection line 62 extends to the inside of the optical connector 36, and is connected to the circuit board 80 in the optical connector. The first ends of the first breaking detection line 61 and the second breaking detection line 62 disposed inside the optical connector 36 are electrically connected to each other via the circuit board 80.

Further, the second end of the first breaking detection line 61 and the second end of the second breaking detection line 62 are connected to the determination unit 60 as shown in FIG. 6, and are electrically connected to each other via the determination unit 60.

Here, when the optical fiber 21 is broken for some reason, the laser light exits from the broken portion, and the first breaking detection line 61 or the second breaking detection line 62 is fused.

As a result, the energization of the closed circuit formed between the first breaking detection line 61 and the second breaking detection line 62 is cut off. The determination unit 60, which monitors the energized state of the circuit, detects the breaking of the optical fiber 21 due to the block of energization, and determines that the laser device 100 is not available to emit the laser light. The determination unit 60 controls the light source 50 such that the laser device 100 does not emit the laser light. Thus, the emission of the laser light is stopped in the laser device 100. Further, since it is possible to prevent the laser light from exiting from the broken portion and applying to the peripheral equipment and the operator, it is possible to prevent the peripheral equipment from being damaged and ensure the safety of the operator.

Figure 4:
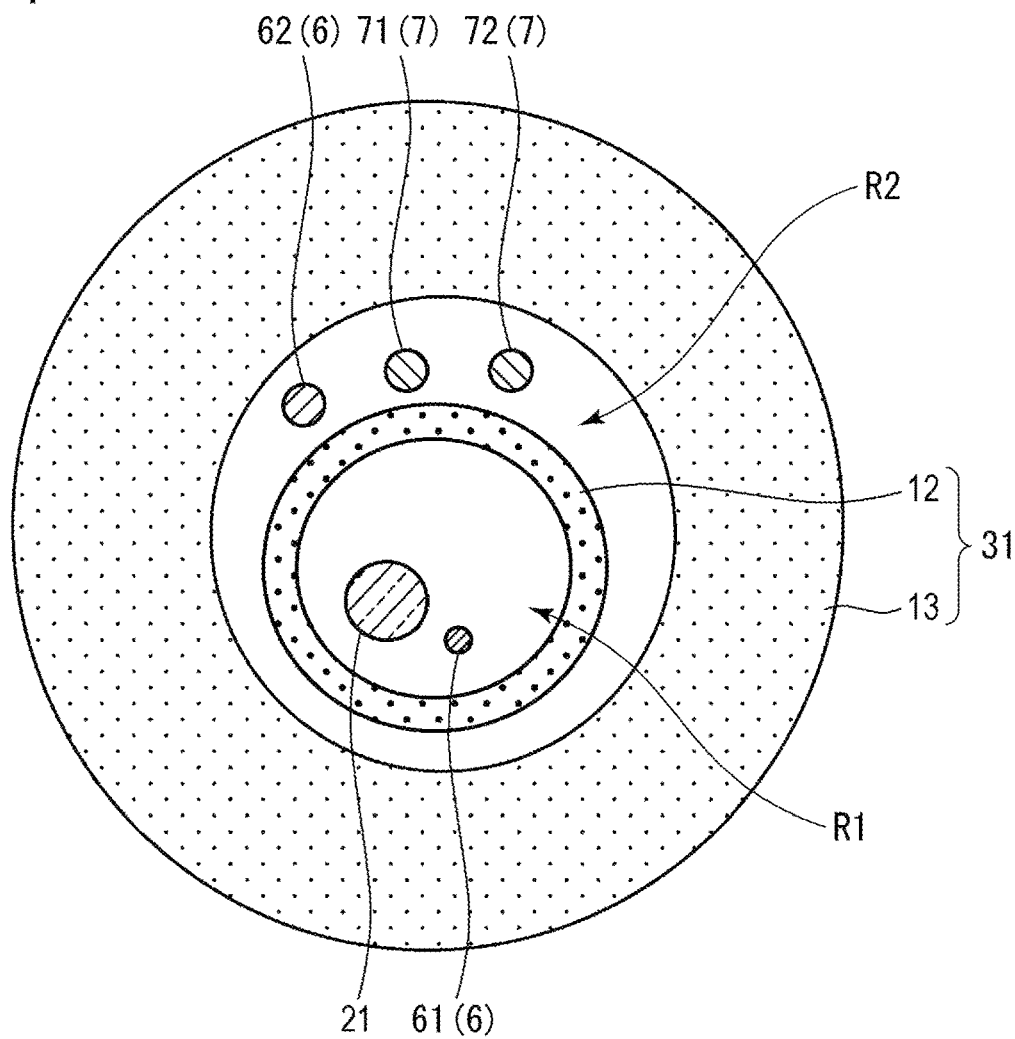
FIG. 4 is a cross-sectional view of an optical fiber cable according to the present embodiment.

Further, the cable jacket 31 has an outer tube 13 and an inner tube 12 formed in a cylindrical shape as shown in FIG. 4. The outer tube 13 is disposed so as to cover the inner tube 12. That is, the cable jacket 31 is composed of a double tube.

As the material of the cable jacket 31, polyolefin (PO) resins such as polyethylene (PE), polypropylene (PP), ethylene ethyl acrylate copolymer (EEA), ethylene vinyl acetate copolymer (EVA), and ethylene propylene copolymer (EP), polyvinyl chloride (PVC), or the like can be used. The outer tube 13 and the inner tube 12 may be made of the same material or may be made of different materials.

An optical fiber 21 through which laser light propagates and a first breaking detection line 61 coated with an insulating layer are inserted into the first region R1 inside the inner tube 12. Both ends of the optical fiber 21 are optically connected to the optical connector 36 and the optical combiner 20, respectively. The first breaking detection line 61 may not be provided with an insulating layer.

In the first region R1, the first breaking detection line 61 may be provided along the longitudinal direction in which the optical fiber 21 extends, or may be provided so as to spirally wind along the longitudinal direction of the optical fiber 21.

The second breaking detection line 62, the first open detection line 71, and the second open detection line 72 are inserted into the second region R2 between the outside of the inner tube 12 and the inside of the outer tube 13. The second breaking detection line 62, the first open detection line 71, and the second open detection line 72 may each be coated with an insulating layer.

As described above, among the first breaking detection line 61, the second breaking detection line 62, the first open detection line 71, and the second open detection line 72, the first breaking detection line 61 disposed in the first region R1 is disposed at the position closest to the optical fiber 21.

Here, when a breaking occurs in the optical fiber 21 for some reason and laser light exits from the broken portion, the first breaking detection line 61 disposed at the position closest to the optical fiber 21 is preferentially fused. Thus, the energization of the circuit formed between the first breaking detection line 61 and the second breaking detection line 62 is cut off, so that the breaking of the optical fiber 21 is detected.

Further, the first region R1 in which the optical fiber 21 and the first breaking detection line 61 are disposed and the second region R2 in which the second breaking detection line 62 is disposed are separated by a partition wall of the inner tube 12. Thus, after the breaking is detected, it is possible to prevent the first breaking detection line 61 and the second breaking detection line 62 from coming into contact with each other, and being determined to be energized again. In this way, the breaking of the optical fiber 21 in the longitudinal direction of the optical fiber cable 30 can be reliably detected by the first breaking detection line 61 and the second breaking detection line 62.

Further, the thickness of the insulating layer of the first breaking detection line 61 may be smaller than the thickness of the insulating layer of the second breaking detection line 62.

Further, the first breaking detection line 61 is disposed closer to the optical fiber 21 than the second breaking detection line 62. Thus, when a breaking occurs in the optical fiber 21 and the laser light exits from the broken portion, the first breaking detection line 61 is fused at an early stage. On the other hand, the second breaking detection line 62, which is separated from the broken portion by the partition wall of the inner tube 12 and has a relatively large thickness of the insulating layer, is less likely to be fused than the first breaking detection line 61. Therefore, even when the first breaking detection line 61 and the second breaking detection line 62 come into contact with each other, since the second breaking detection line 62 is coated with the insulating layer, it is suppressed that the breaking detection lines are energized again in the circuit. As a result, it is possible to detect the breaking of the optical fiber more reliably.

The first breaking detection line 61 may not have an insulating layer, and the signal wire may be exposed. That is, among the first breaking detection line 61 and the second breaking detection line 62, only the second breaking detection line 62 may include an insulating layer. Compared with the case where the first breaking detection line 61 is coated with an insulating layer, the first breaking detection line 61 can be fused at an early stage when the optical fiber 21 is broken, so that it is possible to detect the breaking of the optical fiber 21 at an early stage.

Further, the first open detection line 71 and the second open detection line 72 coated with an insulating layer are inserted into the second region R2.

That is, the first region R1 in which the optical fiber 21 and the first breaking detection line 61 are disposed and the second region R2 in which the first open detection line 71 and the second open detection line 72 are disposed are separated by a partition wall of the inner tube 12. Therefore, even in a case where the first breaking detection line 61 is fused when a breaking occurs in the optical fiber 21 and the laser light exits from the broken portion, it is suppressed that the first open detection line 71 and the second open detection line 72 come into contact with each other and are energized. Further, even when the first open detection line 71 and the second open detection line 72 have an insulating layer, it is possible to prevent the coating layer from being damaged by the laser light and the open detection lines 71 and 72 from coming into contact with each other and being energized. As a result, it is possible to reliably detect a connection failure between the optical fiber cable 30 and the laser head.

At least one of the first open detection line 71 and the second open detection line 72 may be disposed in the second region R2 where the optical fiber 21 is not disposed. That is, among the first region R1 and the second region R2, the optical fiber 21 may be disposed in either one of the first region R1 or the second region R2, and at least one of the pair of open detection lines 7 may be disposed in the other. Thus, even if a breaking of the optical fiber 21 occurs in the optical fiber cable, for example, it is possible to detect the breaking of the optical fiber 21 by the breaking of at least one of the open detection lines 7. Further, since one of the open detection lines 7 is separated from the optical fiber 21 by the partition wall of the inner tube 12, it is possible to prevent the open detection lines 7 from coming into contact with each other and being energized.

Figure 5:
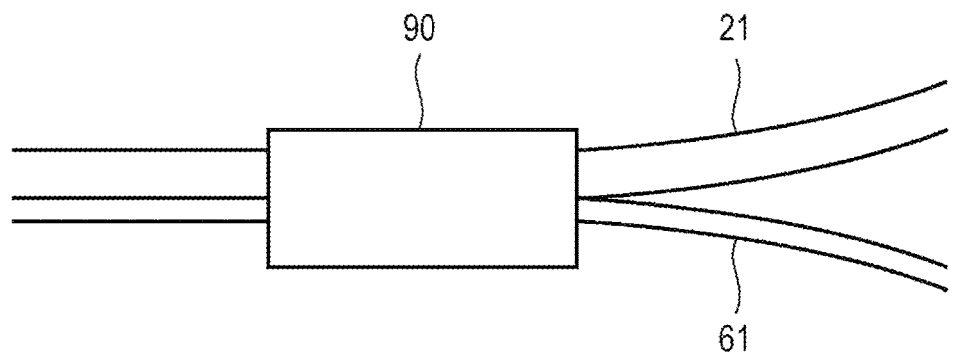
FIG. 5 is a conceptual diagram showing a part of the optical fiber cable according to the present embodiment.

Further, as shown in FIG. 5, the optical fiber 21 and the first breaking detection line 61 may be integrated by a coating member 90 at least in part. The coating member 90 may be, for example, a heat shrinkable tube.

In the region where the optical fiber 21 and the first breaking detection line 61 are integrated by the coating member 90, when a breaking occurs in the optical fiber 21 and the laser light exits from the broken portion, the first breaking detection line 61 can be fused at an early stage. Therefore, it is possible to detect the breaking of the optical fiber 21 at an early stage.

The region where the coating member 90 is disposed may be disposed at any position in the longitudinal direction of the optical fiber 21. The optical fiber 21 and the first breaking detection line 61 may be integrated inside the optical connector 36 by the coating member 90 at least in part.

For example, when a laser light is applied to a workpiece, the optical fiber 21 is likely to be broken inside the optical connector, due to the reflected light from the workpiece. According to the configuration in which the optical fiber 21 and the first breaking detection line 61 are integrated by the coating member 90 inside the optical connector 36, the first breaking detection line 61 can be preferentially fused inside the optical connector 36 where the optical fiber 21 is likely to be broken. In this way, it is possible to detect the breaking of the optical fiber 21 in the optical connector 36 at an early stage.

The optical fiber 21 and the first breaking detection line 61 may be integrated by the coating member 90 inside the cable jacket 31, or at a plurality of locations in the longitudinal direction of the optical fiber 21.

(Temperature Detection Line)

Figure 3B:
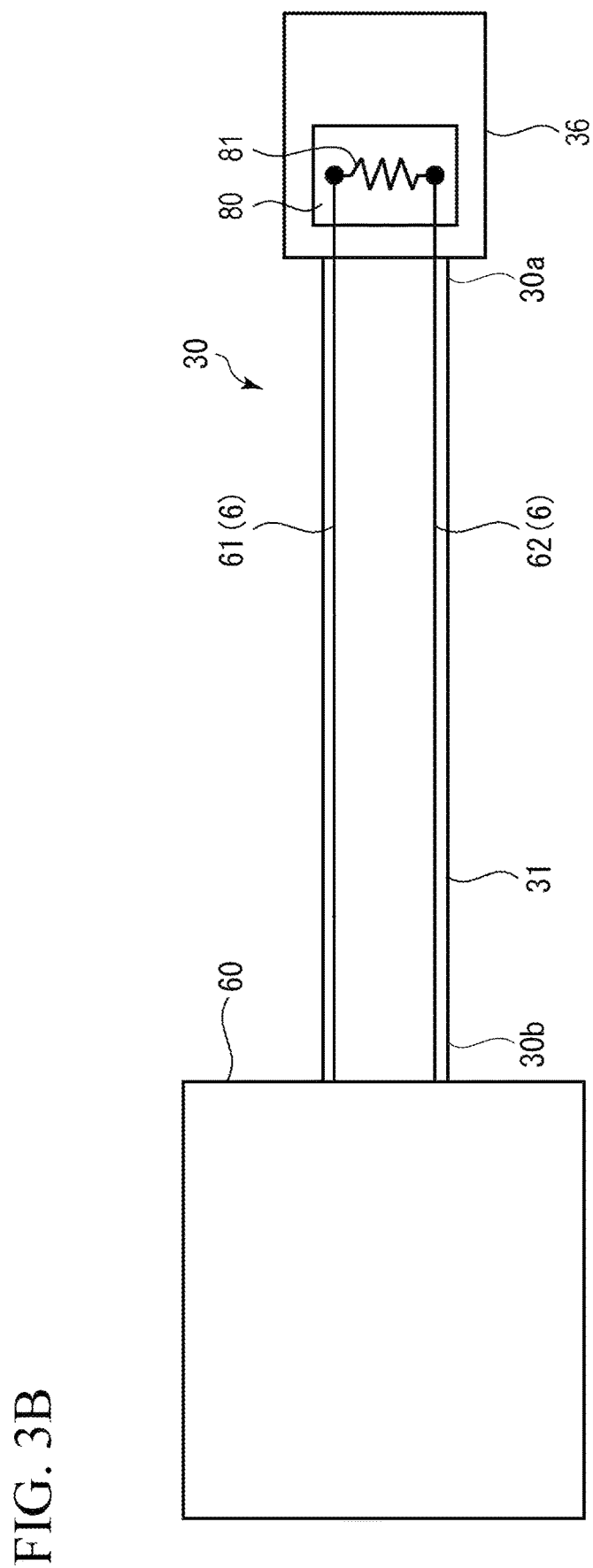
FIG. 3B is a conceptual diagram showing a modification example of a part (breaking detection line portion) of the laser device of FIG. 3A.

Further, as shown in FIG. 3B, the first ends of the first breaking detection line 61 and the second breaking detection line 62 may be electrically connected to each other via the temperature sensor 81 inside the optical connector 36. In FIG. 3B, the temperature sensor 81 is disposed on the circuit board 80 disposed in the optical connector 36. The temperature sensor 81 is capable of detecting a temperature change inside the optical connector. A thermistor may be used as the temperature sensor 81. A thermistor is an electronic component whose resistance value changes due to temperature changes. The temperature information electrically detected by the temperature sensor 81 is input to the determination unit 60.

Since the first end of the first breaking detection line 61 and the first end of the second breaking detection line 62 are connected to the circuit board 80, the first breaking detection line 61 and the second breaking detection line 62 are electrically connected to each other via the temperature sensor 81 to form a closed circuit.

With such a configuration, the breaking detection line 6 can also be used as the temperature detection line. That is, the pair of detection lines have both the functions of detecting the breaking of the optical fiber and measuring the temperature inside the optical connector.

As described above, the optical fiber cable 30 of the present embodiment includes an optical fiber 21 through which the laser light output from a light source 50 propagates; a cable jacket 31 including an inner tube 12 and an outer tube 13 covering the inner tube 12; a pair of open detection lines 7 including a first open detection line 71 and a second open detection line 72; and an optical connector 36 disposed at a first end 30a of the optical fiber cable 30, in which a first end of the first open detection line 71 and a first end of the second open detection line 72 are disposed inside the optical connector 36, and are not electrically connected to each other inside the optical connector 36, the optical fiber 21 is disposed in either a first region R1 inside the inner tube 12, or a second region R2 between an outside of the inner tube 12 and an inside of the outer tube 13, and at least one of the pair of open detection lines 7 is disposed in either the first region R1 or the second region R2 in which the optical fiber 21 is not disposed.

With this configuration, when the optical connector 36 of the optical fiber cable 30 is properly connected to the laser head, the first open detection line 71 and the second open detection line 72 are electrically connected to each other. On the other hand, when a connection failure occurs between the optical fiber cable 30 and the laser head, the first open detection line 71 and the second open detection line 72 are not electrically connected. In this way, it is possible to determine whether or not a connection failure between the connecting member 70 and the optical connector 36 has occurred, depending on whether or not the first open detection line 71 and the second open detection line 72 are energized. This makes it possible to detect a connection failure between the optical fiber cable 30 and the laser head.

Further, at least one of the open detection lines 7 is disposed in a region where the optical fiber 21 is not disposed. With this configuration, even if a breaking of the optical fiber 21 occurs in the optical fiber cable 30, the breaking of the optical fiber 21 can be detected, for example, by the breaking of at least one of the open detection lines 7. Further, since one of the open detection lines 7 is separated from the optical fiber 21 by the partition wall of the inner tube 12, it is possible to prevent the pair of open detection lines 7 from coming into contact with each other and being energized.

Further, the optical fiber cable 30 further includes a pair of breaking detection lines 6 including a first breaking detection line 61 and a second breaking detection line 62, in which a first end of the first breaking detection line 61 and a first end of the second breaking detection line 62 may be disposed inside the optical connector 36 and electrically connected to each other inside the optical connector 36.

With this configuration, it is possible to detect a breaking of the optical fiber 21 in the optical fiber cable 30 in addition to a connection failure between the connecting member 70 and the optical connector 36. Further, since the breaking detection line 6 and the open detection line 7 are configured independently, it is possible to independently perform the breaking detection of the optical fiber 21 and the open detection in the optical connector 36.

Further, the first end of the first breaking detection line 61 and the first end of the second breaking detection line 62 may be electrically connected to each other via the temperature sensor 81, inside the optical connector 36.

With this configuration, it is possible to use the breaking detection line 6 as the temperature detection line. That is, the pair of detection lines have both the functions of detecting the breaking of the optical fiber and detecting the temperature inside the optical connector 36.

Further, the optical fiber 21 and the first breaking detection line 61 may be disposed in the first region R1, and the second breaking detection line 62, the first open detection line 71, and the second open detection line 72 may be disposed in the second region R2.

With this configuration, when the optical fiber 21 is broken due to some abnormality, the first breaking detection line 61 disposed in the inner tube 12 is fused and the breaking of the optical fiber is detected. Further, since the first region R1 in which the optical fiber 21 and the first breaking detection line 61 are disposed and the second region R2 in which the second breaking detection line 62, the first open detection line 71, and the second open detection line 72 are disposed are separated by the partition wall of the inner tube 12, it is suppressed that the first breaking detection line 61 and the second breaking detection line 62 come into contact with each other and are energized again.

As a result, it is possible to reliably detect the breaking of the optical fiber 21. Similarly, it is possible to prevent the first open detection line 71 and the second open detection line 72 from being damaged and energized by the leaked laser light. This makes it possible to reliably detect a connection failure between the optical fiber cable 30 and the laser head.

Further, among the first breaking detection line 61, the second breaking detection line 62, the first open detection line 71, and the second open detection line 72, at least a part of the first breaking detection line 61 may be disposed at a position closest to the optical fiber 21, inside the cable jacket 31, the second breaking detection line 62 located inside the cable jacket 31 may be coated with an insulating layer, and the first breaking detection line 61 located inside the cable jacket 31 may have no insulating layer or may be coated with an insulating layer having a thickness smaller than a thickness of an insulating layer of the second breaking detection line 62.

With this configuration, when a breaking occurs in the optical fiber 21 due to some abnormality, the first breaking detection line 61 can be preferentially fused, and it is possible to detect the breaking of the optical fiber 21 at an early stage.

Further, the optical fiber 21 and the first breaking detection line 61 may be integrated by the coating member 90 at least in part.

Thus, when a breaking occurs in the optical fiber 21 due to some abnormality, the first breaking detection line 61 can be further preferentially fused, and it is possible to detect the breaking of the optical fiber 21 at an early stage.

Further, the optical fiber 21 and the first breaking detection line 61 may be integrated by a coating member 90 at least in part inside the optical connector 36.

For example, when a laser light is applied to a workpiece, the optical fiber is likely to be broken inside the optical connector 36 due to the influence of the reflected light. According to such a configuration, when a breaking occurs in the optical fiber 21 inside the optical connector 36 where the optical fiber 21 is likely to be broken, the first breaking detection line 61 can be preferentially fused, and it is possible to detect the breaking of the optical fiber 21 in the optical connector 36 at an early stage.

The optical combiner unit 2 of the present embodiment may include the optical fiber cable 30, and an optical combiner 20 that receives light output from a plurality of input optical fibers 11, in which the exit end of the optical combiner 20 and the core of the optical fiber 21 disposed in the optical fiber cable 30 may be optically connected.

With the above-described optical fiber cable 30, it is possible to achieve an optical combiner unit 2 capable of detecting a connection failure between the optical fiber cable 30 and the laser head.

Further, the laser device 100 of the present embodiment may include the optical fiber cable 30 and at least one light source 50 that emits light propagating through the optical fiber cable 30.

With the above-described optical fiber cable 30, it is possible to achieve a laser device 100 capable of detecting a connection failure between the optical fiber cable 30 and the laser head.

It should be noted that the technical scope of the present invention is not limited to the above-described embodiments or examples, and various modifications can be made without departing from the spirit of the present invention.

For example, the optical fiber cable 30 may not include the breaking detection line 6.

Further, the components disposed in the first region R1 and the second region may be interchanged. For example, the second breaking detection line 62, the first open detection line 71, and the second open detection line 72 may be disposed in the first region R1, and the optical fiber 21 and the first breaking detection line 61 may be disposed in the second region R2.

It is also possible to adopt a configuration in which the first open detection line 71 and the second open detection line 72 are not each coated with an insulating layer. In this case, one of the pair of open detection lines 7 may be disposed in the first region R1 and the other may be disposed in the second region. Further, in the cross-sectional view of the optical fiber cable 30, the first open detection line 71 and the second open detection line 72 may be disposed at positions facing each other with the inner tube 12 interposed therebetween.

Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

REFERENCE SIGNS LIST

1: Light propagation unit
2: Optical combiner unit
6: Breaking detection line
7: Open detection line
10: Laser unit
11: Input optical fiber
12: Inner tube
13: Outer tube
20: Optical combiner
21: Optical fiber
30: Optical fiber cable
31: Cable jacket
36: Optical connector
50: Light source
60: Determination unit
61: First breaking detection line
62: Second breaking detection line
71: First open detection line
72: Second open detection line
80: Circuit board
81: Temperature sensor
90: Coating member
100: Laser device
R1: First region
R2: Second region

What is claimed is:

1. An optical fiber cable comprising:
an optical fiber through which laser light output from a light source propagates;
a cable jacket that comprises an inner tube and an outer tube covering the inner tube;
a first open detection line and a second open detection line;
a first breaking detection line and a second breaking detection line; and
an optical connector disposed at a first end of the optical fiber cable, wherein
a first end of the first open detection line and a first end of the second open detection line are disposed inside the optical connector and are not electrically connected to each other inside the optical connector,
a first end of the first breaking detection line and a first end of the second breaking detection line are disposed inside the optical connector and are electrically connected to each other inside the optical connector,
the optical fiber is disposed in one of a first region and a second region, wherein the first region is inside the inner tube and the second region is between an outer surface of the inner tube and an inner surface of the outer tube, and
at least one of the first open detection line and the second open detection line is disposed in the other of the first region and the second region in which the optical fiber is not disposed.

2. The optical fiber cable according to claim 1, wherein the first end of the first breaking detection line and the first end of the second breaking detection line are electrically connected to each other inside the optical connector via a temperature sensor.

3. The optical fiber cable according to claim 1, wherein the optical fiber and the first breaking detection line are disposed in the first region, and
the second breaking detection line, the first open detection line, and the second open detection line are disposed in the second region.

4. The optical fiber cable according to claim 1, wherein among the first breaking detection line, the second breaking detection line, the first open detection line, and the second open detection line, at least a part of the first breaking detection line is disposed at a position closest to the optical fiber, inside the cable jacket,
the second breaking detection line inside the cable jacket is coated with an insulating layer, and
the first breaking detection line inside the cable jacket either has no insulating layer or is coated with an insulating layer having a thickness smaller than a thickness of the insulating layer of the second breaking detection line.

5. The optical fiber cable according to claim 1, wherein the optical fiber and the first breaking detection line are integrated by a coating tube at least in part.

6. The optical fiber cable according to claim 5, wherein the optical fiber and the first breaking detection line are integrated by the coating tube at least in part inside the optical connector.

7. An optical combiner unit comprising:
the optical fiber cable according to claim 1; and
an optical combiner that receives light output from a plurality of input optical fibers, wherein
an exit end of the optical combiner optically connects to a core of the optical fiber disposed in the optical fiber cable.

8. A laser device comprising:
the optical fiber cable according to claim 1; and
a light source that emits light propagating through the optical fiber cable.

* * * * *